(12) United States Patent
Keinert et al.

(10) Patent No.: US 9,761,304 B1
(45) Date of Patent: Sep. 12, 2017

(54) WRITE-BITLINE CONTROL IN MULTICORE SRAM ARRAYS

(71) Applicant: International Business Machines Corporation, Armonk, NY (US)

(72) Inventors: Joachim Keinert, Altdorf (DE); Jens Noack, Stuttgart (DE); Monika Strohmer, Sindelfingen (DE); Holger Wetter, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/277,026

(22) Filed: Sep. 27, 2016

(51) Int. Cl.
| | | |
|---|---|---|
| G11C 8/18 | (2006.01) | |
| G11C 11/417 | (2006.01) | |
| G11C 11/419 | (2006.01) | |
| G11C 7/00 | (2006.01) | |
| G11C 7/22 | (2006.01) | |
| G11C 11/418 | (2006.01) | |
| G06F 21/55 | (2013.01) | |

(52) U.S. Cl.
CPC .......... *G11C 11/419* (2013.01); *G11C 11/418* (2013.01); *G06F 21/554* (2013.01); *G11C 7/22* (2013.01); *G11C 11/417* (2013.01)

(58) Field of Classification Search
CPC ....... G11C 7/22; G11C 11/419; G11C 11/417; G06F 21/554
USPC ....... 365/154, 155, 156, 63, 230.01; 326/38, 326/41, 47
See application file for complete search history.

(56) References Cited

U.S. PATENT DOCUMENTS

| | | | |
|---|---|---|---|
| 4,465,945 A | 8/1984 | Yin | |
| 4,772,812 A | 9/1988 | Desmarais | |
| 5,511,029 A * | 4/1996 | Sawada ................. | G11C 29/40 365/189.05 |
| 5,657,292 A * | 8/1997 | McClure ................. | G11C 7/00 365/221 |
| 6,028,809 A * | 2/2000 | Schleicher ....... | H03K 19/17704 365/230.03 |
| 6,202,133 B1* | 3/2001 | Jeddeloh ............. | G06F 12/0607 711/157 |
| 6,507,581 B1* | 1/2003 | Sgammato ............. | H04Q 3/521 326/38 |
| 6,671,201 B2 | 12/2003 | Masuda | |
| 6,731,134 B1 | 5/2004 | Bucossi et al. | |
| 8,233,342 B2 | 7/2012 | Adams et al. | |
| 8,441,874 B2 | 5/2013 | Sinha et al. | |
| 8,824,230 B2 | 9/2014 | Phan et al. | |
| 9,336,863 B2 | 5/2016 | Jung et al. | |
| 2001/0002886 A1* | 6/2001 | Ooishi ................. | G11C 7/065 365/196 |

(Continued)

*Primary Examiner* — Ly D Pham
(74) *Attorney, Agent, or Firm* — Bryan D. Wells; Steven Fisher-Stawinski (57) ABSTRACT

An integrated circuit includes a static random access memory array. The static random access memory array includes at least two cores, wherein only one of the cores is written at a time. The integrated circuit further includes a tristate driver. The tristate driver is configured to apply a high impedance state to one of the cores that is not being written. A corresponding electronic dataset product includes a description for the integrated circuit expressed in a hardware description language. A corresponding computer-implemented method generates an electronic description for the integrated circuit expressed in a hardware description language.

17 Claims, 8 Drawing Sheets

(56) References Cited

U.S. PATENT DOCUMENTS

| | | |
|---|---|---|
| 2007/0081379 A1 | 4/2007 | Clinton et al. |
| 2008/0123442 A1 | 5/2008 | Behrends et al. |
| 2008/0123841 A1* | 5/2008 | Plessier ............... H04L 9/0643 380/28 |
| 2013/0003443 A1 | 1/2013 | Houston |
| 2014/0169106 A1 | 6/2014 | Kolar et al. |
| 2016/0086659 A1 | 3/2016 | Kugel et al. |

* cited by examiner

| WR_ADR0 | WR-Clk | BOOSTN | WBLT |
|---|---|---|---|
| 0 | 0 | 1 | data_in |
| 0 | 1 | 0 | data_in (NBA active) |
| 1 | 0 | 0 | High Z |
| 1 | 1 | 0 | High Z |

FIG. 3A

| WR_CLK | ENA_N | DI | BOOSTN | Boost Cap VVS-BOOSTN | VVS | WBLT | WBLC |
|---|---|---|---|---|---|---|---|
| X | 1 | X | 0 | | X | high Z | high Z |
| | | | | | | | |
| 0 | 0 | 1 | 1 | -VDD | 0 | 1 | 0 |
| ↗ | 0 | 1 | ↘ | discharging | 0 -> neg | 1 | 0 -> neg |
| 1 | 0 | 1 | 0 | - x * VDD | - x *VDD | 1 | -x * VDD |
| ↘ | 0 | 1 | ↗ | charging | neg -> 0 | 1 | neg -> 0 |
| 0 | 0 | 1 | 1 | -VDD | 0 | 1 | 0 |
| | | | | | | | |
| 0 | 0 | 0 | 1 | -VDD | 0 | 0 | 1 |
| ↗ | 0 | 0 | ↘ | discharging | 0 -> neg | 0 -> neg | 1 |
| 1 | 0 | 0 | 0 | - x * VDD | - x *VDD | -x * VDD | 1 |
| ↘ | 0 | 0 | ↗ | charging | neg -> 0 | neg -> 0 | 1 |
| 0 | 0 | 0 | 1 | -VDD | 0 | 0 | 1 |

WRITE-BITLINE CONTROL IN MULTICORE SRAM ARRAYS

BACKGROUND

The present invention relates generally to the field of integrated circuits, and more particularly to write-bitline control in multicore static random access memory arrays.

Current implementations of Static Random Access Memory ("SRAM") usually include a Negative Bitline Assist ("NBA"), also known as a "write assist", circuit to ensure that negative voltages are transmitted through to all cells of the memory array. At the same time, SRAMs have been introduced that use multiple cores, only one of which may be written at a time. Engineers continue to face challenges in write-bitline circuitry for SRAM arrays involving multiple cores, NBA, or both.

SUMMARY

An integrated circuit includes a static random access memory array. The static random access memory array includes at least two cores, wherein only one of the cores is written at a time. The integrated circuit further includes a tristate driver. The tristate driver is configured to apply a high impedance state to one of the cores that is not being written. A corresponding electronic dataset product includes a description for the integrated circuit expressed in a hardware description language. A corresponding computer-implemented method generates an electronic description for the integrated circuit expressed in a hardware description language.

DETAILED DESCRIPTION

Figure 1:
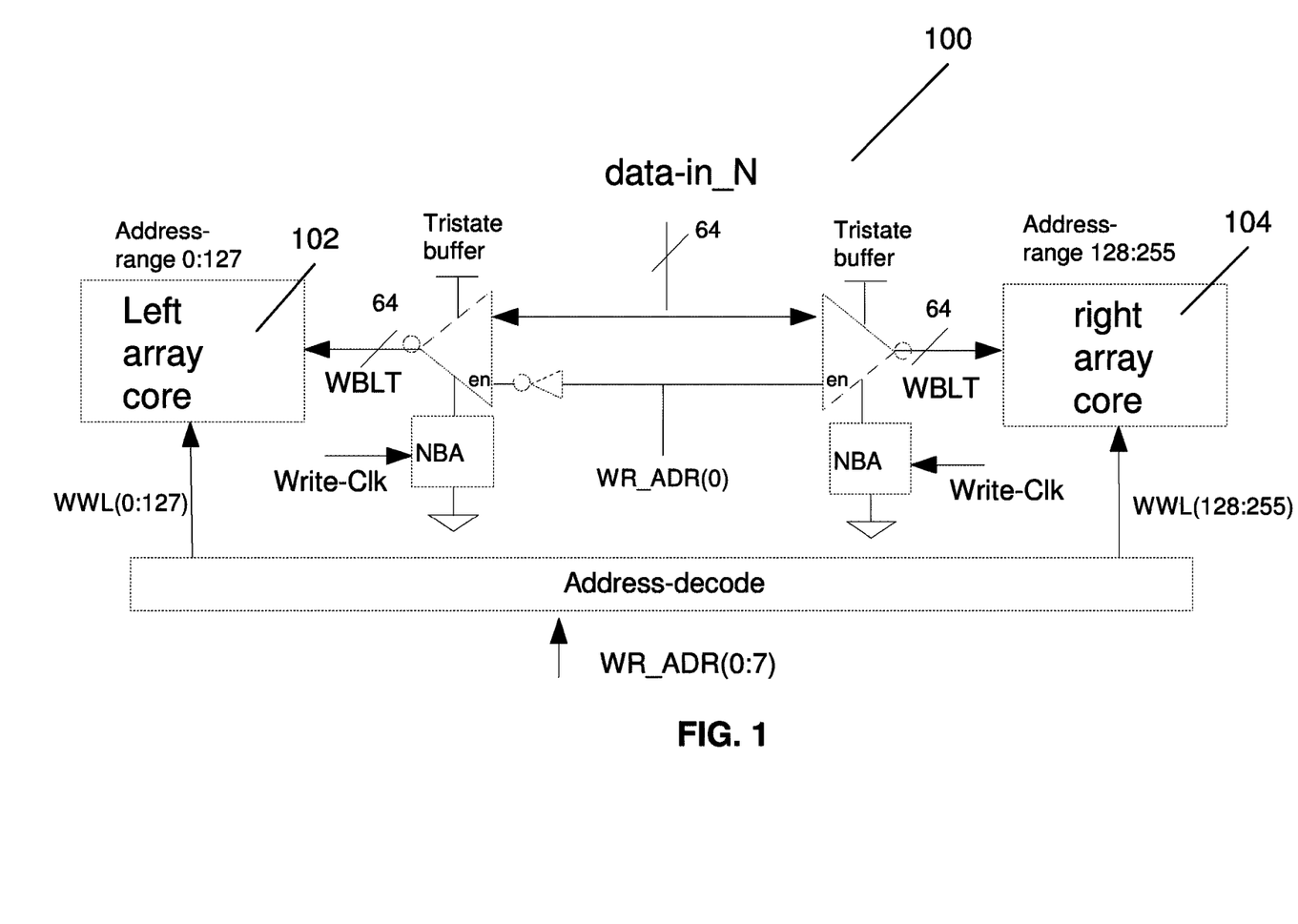
FIG. 1 is a block diagram for an SRAM array, in accordance with at least one embodiment of the invention.

Referring now to the invention in more detail, FIG. 1 depicts a block diagram of a Static Random Access Memory "SRAM" array including two cores: a left array core 102 and a right array core 104. As used herein, a "core" may be understood to include two or more memory cells (i.e., bits) in a configuration less than an entire array, with an entire array encompassing an entire address space for the memory system in which it is included. In the context of the present invention, the memory cells are understood to be SRAMs, for example implemented with latches, such that the cells are less volatile than in dynamic memory.

In the depicted embodiment, the SRAM array 100 is configured for 8-bit addressing at the Address-decode block, with the left array core 102 storing address ranges 0-127 and the right array core 104 storing address ranges 128-255. Both the left and right array cores 102 and 104 are supported by Negative Bitline Assist ("NBA") circuits, also termed in the art "write assist" circuits. NBA improves writeability of SRAMs at low voltages by driving either the true or complementary bitlines below VSS (negative supply voltage and/or ground) during a write operation, hence increasing the voltage difference across the SRAM cell during the write operation.

In the depicted embodiment, two cores are present for a single write port, which has the characteristic of being limited to writing only one core at a time, with each core being associated with half of the address space. Since the depicted embodiment displays 8-bit addressing, the two cores are distinguished by the address's most significant bit (left array core 102 stores 0-127, or binary 00000000-01111111 and right array core 104 stores 128-255, or binary 100000000-11111111). It will be understood, however that embodiments of the invention where more than two cores are accessible by a single write-bitline are possible where the core to write is designated by a pattern of more than one bit. Similarly, for embodiments where the SRAM array 100 includes multiple simultaneous write lines, then the invention may be understood as applicable to those cores that are accessible to a single write-bitline.

The inventors have observed and/or recognized that, although only one core of the SRAM array 100 (per write-bitline) can be accessed at a time, the write-data is still driven to all cores in parallel, creating unwanted switching activity in the cores that are not written. The inventors have further observed and/or recognized that, in order to avoid and/or reduce unnecessary switching activity, the write-bitlines of the inactive core can be set to a high-Z (high impedance) state by means of a tristate driver. FIG. 1 depicts how the tristate buffers may be applied to the left and right array cores to apply a high-Z state to the WBLT (one type of write-bitline) terminal of the SRAM array core. Additionally, the inventors have further observed and/or recognized that the tristate driver can be combined with the NBA circuit to eliminate a series transistor from the tristate driver, resulting in reduced area for the combined bitline driver and NBA circuit as compared with a separate circuits for the two functions. Comparing FIG. 4 (452, 454) with FIG. 5 (552, 554) shows where the inline transistor may be removed in embodiments according to FIG. 5. It will be understood that the foregoing discussion of possible advantages for some embodiments need not necessarily be present in all embodiments where the invention is practiced.

Figure 2:
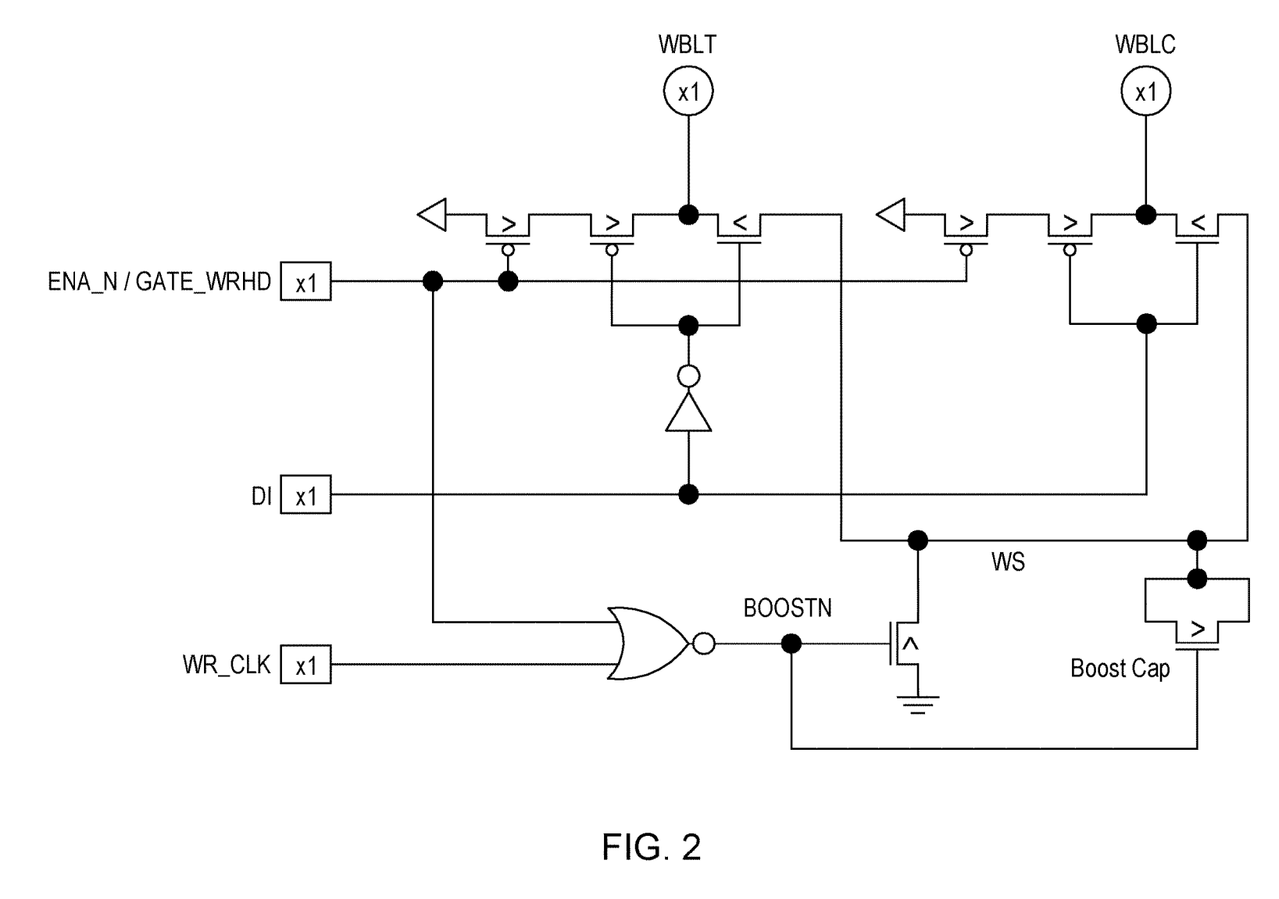
FIG. 2 is a gate-level schematic diagram for a tristate driver for a core of an SRAM array with NOR logic control, in accordance with at least one embodiment of the invention.

Referring now to FIG. 2, FIG. 2 provides a gate-level schematic diagram of an integrated circuit according to at least one embodiment of the present invention. In the depicted embodiment, a single core writes using a single write-bitline with two associated terminals labeled WBLT and WBLC, which are both placed into high-Z state when a different core is being written. In the depicted embodiment, the terminal ENA_N/GATE_WRHD (hereinafter ENA_N) refers to a control signal for the high-Z state. In embodiments with two cores per write-bitline, ENA_N can be based directly on the most significant bit of the write address. In other embodiments, ENA_N evinces a logically derived signal based on additional address bits or other factors to arrive at a signal for high-Z, one, or zero for the core being controlled by the signal. The terminal WR_CLK designates the write clock for the SRAM of which the integrated circuit is a part. As shown, ENA_N and WR_CLK are inputs to a logic NOR whose output is BOOSTN, and which operates to apply high-Z to the WBLT and WBLC terminals.

Figure 3A:
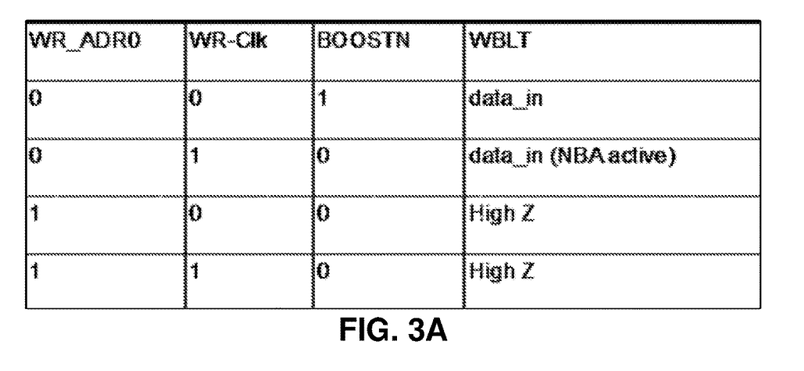
FIG. 3A is a truth table for a tristate driver and negative bitline write assist for a core of an SRAM array, in accordance with at least one embodiment of the invention.

FIG. 3A provides a simplified truth table for BOOSTN and WBLT, based on WR_ADR0 (the most significant bit of the write address) and the write clock for a circuit according to FIG. 2, with the assumptions that the circuit is one of two cores written on this write-bitline and that this core stores the lower half of the address block, equivalent to the left array core of FIG. 1 and addresses 0-127 for 8-bit addressing. As shown, when WR_ADR0 is set to one, then the circuit applies high-Z to WBLT, regardless of the write clock, but while WR_ADR0 is set to zero, the circuit applies the input data state to WBLT, with active NBA when the write clock is active.

Figure 3B:
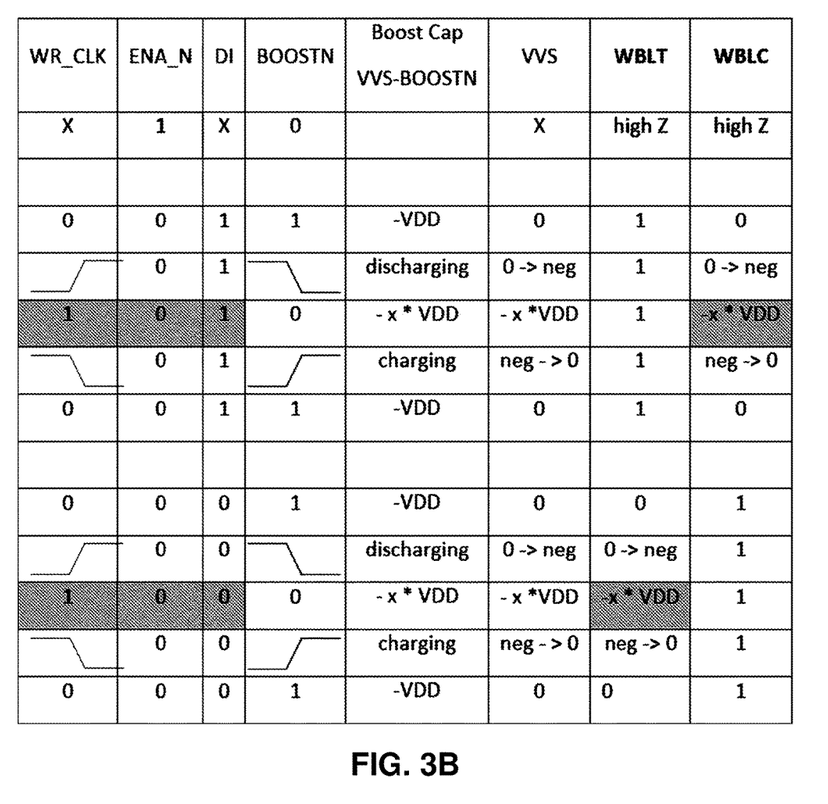
FIG. 3B is a more detailed truth table for a tristate driver and negative bitline write assist for a core of an SRAM array, in accordance with at least one embodiment of the invention.

FIG. 3B shows a more detailed truth table for a circuit according to FIG. 2, but where ENA_N is not assumed to be equal to the most significant bit of the address, nor is anything assumed about the core to which the depicted circuit belongs. In FIG. 3B, in all cases where ENA_N is set to one, the WBLT and WBLC terminals are in high-Z regardless of the other input values, associated with writing to a different core than that to which the depicted circuit belongs. When ENA_N, the DI (data in) terminal determined whether writing will occur on WBLT or WBLC, equivalent to writing a one (WBLT) or a zero (WBLC). The BOOSTN and VVS points in the circuit describe various intermediate operations associated with the NBA circuit in different states and at the leading and tailing edges of the write clock signal.

Figure 4:
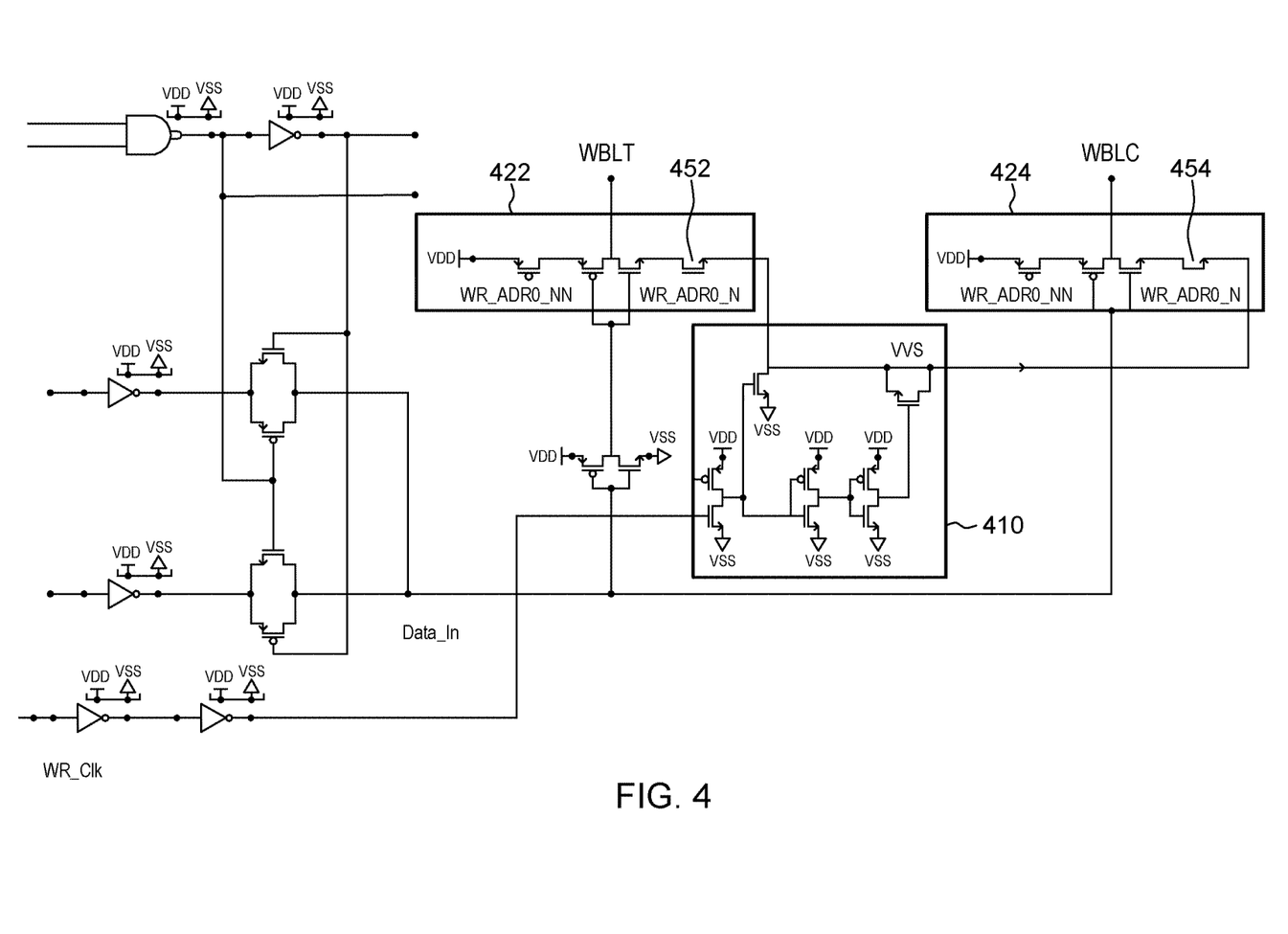
FIG. 4 is a transistor-level schematic diagram of a tristate driver for a core of an SRAM array using an additional inline transistor, in accordance with at least one embodiment of the invention.

Referring now to FIG. 4, FIG. 4 is a transistor-level schematic diagram of an integrated circuit according to at least one embodiment of the invention. The entire depicted circuit may be understood as for an SRAM array 100, according to FIG. 1 with a left and right core, or with multiple cores (generally, the SRAM array 100 may be understood to include at least two cores) where only one core is written at a time. The terminals marked WBLT and WBLC are the two write terminals (i.e., bitline drivers) for the single core to which the depicted circuit belongs. WBLT is driven by a first tristate driver 422, and WBLC is driven by a second tristate driver 424. In the figures, each tristate driver 422 and 424 is given as a boxed region surrounding those devices that belong the tristate driver structure. Thus, as shown, in the depicted embodiment, both tristate drivers 422 consume, as inputs, WR_ADR0_N and WR_ADR0_NN (negation and double-negation of the most significant bit of the write address), Data_In (a bit to be written), and VVS (output of the NBA circuit 410). In the depicted embodiment, the output of each tristate driver 422 and 424 is either a data bit for writing or the application of a high-Z (high-impedance) state to the core, where the depicted core may be understood, in general, as one of the at least two cores of the SRAM array that is not being written. More generally, in an array with multiple cores, the high-Z (high impedance) state is applied to a write-bitline pair (WBLT and WBLC) of inputs to each of those of the at least two cores that are not being written.

Referring still to the embodiment of FIG. 4, the circuit includes an NBA circuit 410, which outputs the VVS signal, and is thus configured for writing to the SRAM array 100. Thus, tristate drivers 422 and 424 may be understood as applying the high-Z state responsive to the NBA circuit's input, which is processed by inline transistors 452 and 454.

Figure 5:
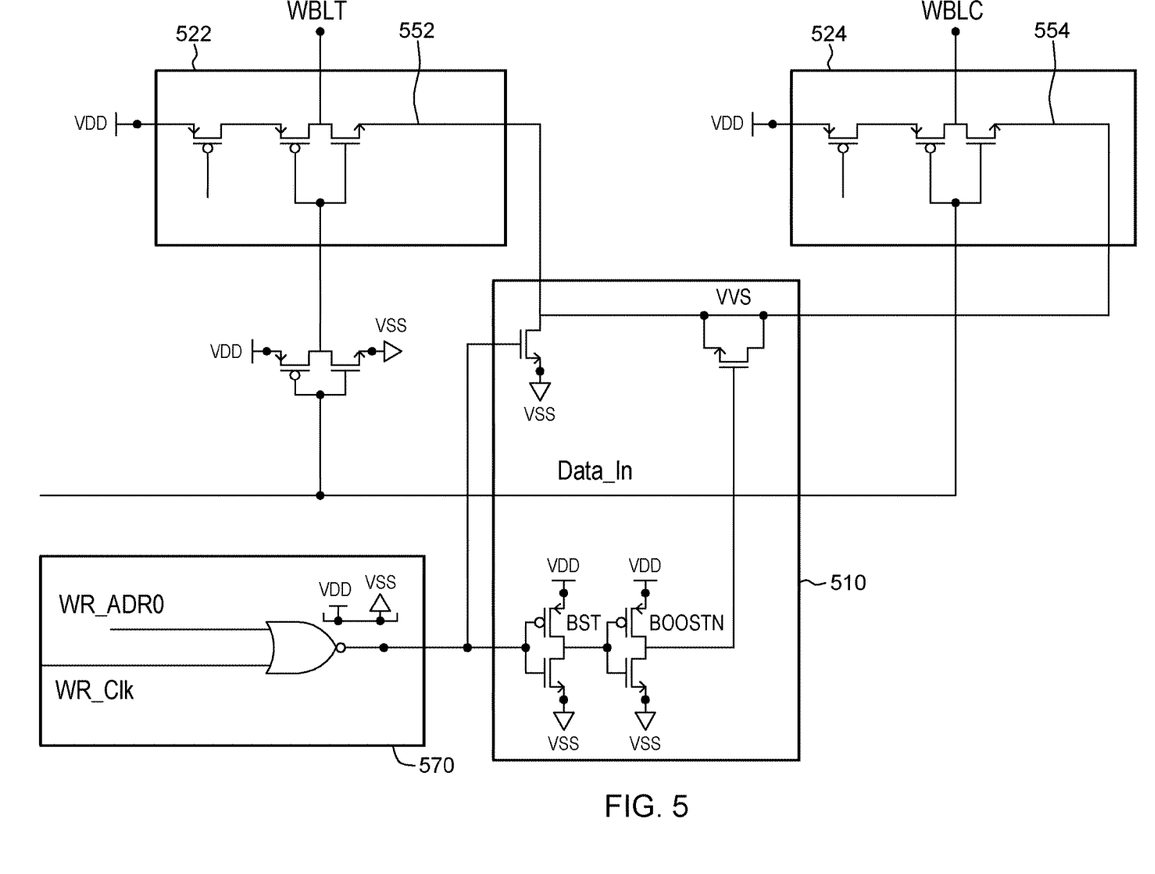
FIG. 5 is a transistor-level schematic diagram of a tristate drive for a core of an SRAM array using NOR logic control without an additional inline transistor, in accordance with at least one embodiment of the invention.

Referring now to FIG. 5, Figure is a transistor-level schematic diagram of an integrated circuit according to at least one embodiment of the invention. Similarly to FIG. 4, the circuit according to the embodiment of FIG. 5 includes tristate drivers 522 and 524, however the first tristate driver 522 lacks an inline transistor at first point 552, and, correspondingly, the second tristate driver 524 lacks a transistor at second point 554. The NBA circuit 510 is similar to that of FIG. 4. Differently from the embodiment of FIG. 4, the input terminals to points 552 and 554 are driven via both VVS and the output of a logic NOR 570, and thus the tristate drivers 522 and 524 are configured to apply the high impedance state in response to a signal from a logic NOR 570, and the logic NOR 570 replaces an inline transistor (both 552 and 554) from the tristate drivers 522 and 524. The inputs of the logic NOR 570 are the write clock (first input signal) and the most significant bit of the write address (second input signal). More generally, the second input signal may be based on at least a portion of the write address directed to the SRAM array 100, such as where more than two cores are written from the same write-bitline. For example, if four cores share a write-bitline, then two bits of the write address may be used to designate which core is to be written. In the depicted embodiment where the second signal is driven by the most significant bit of the write address, however, the depicted core may be understood as equivalently either of a first core and a second core in the SRAM array 100, with the first core associated with a first state (i.e., zero) of the most significant bit of the write address and the second core is associated with a second state (i.e., one) of the most significant bit of the write address.

Figure 6A:
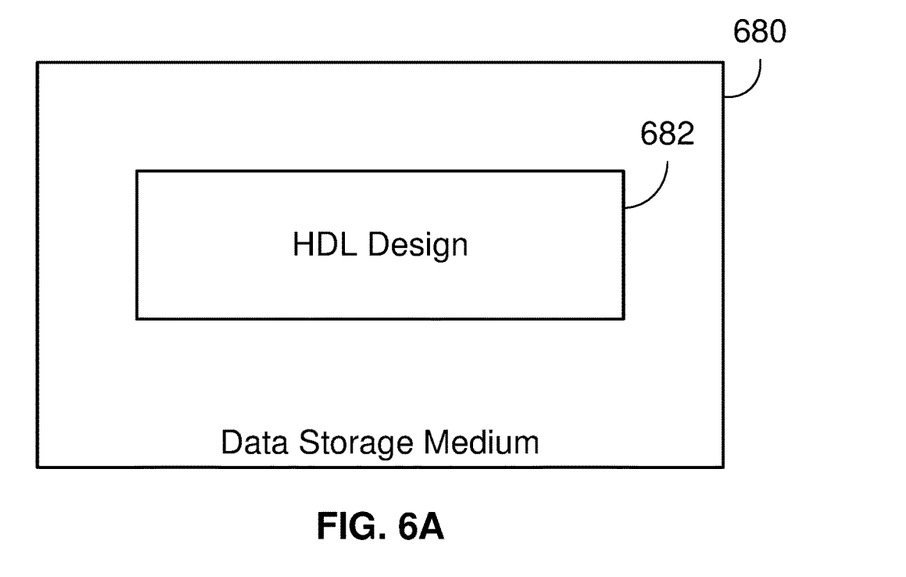
FIG. 6A is a block diagram depicting an electronic dataset product, in accordance with at least one embodiment of the invention.

Various embodiments of the invention may include one or more integrated circuits that form one or more SRAM arrays, as shown in FIGS. 1-5. Additionally, FIG. 6A depicts an electronic dataset product comprising a data storage medium 680 on which is stored an electronically represented design, such as a hardware description language ("HDL") design 682 for one or more circuits according to the foregoing discussion of various embodiments. The HDL design 682 may be at any level of abstraction (e.g., gate-level, logic level, transistor-level, etc.). The data storage medium 600 can include a hard disk drive, optical disk, flash memory, floppy disk, magnetic tape, or other electronic storage medium. The HDL design 682 may be expressed in any hardware description language. Examples of hardware description languages suitable for expression of circuits according to the invention include, but are not limited to, HML, ABEL, AHPL, VHDL and Verilog.

Figure 6B:
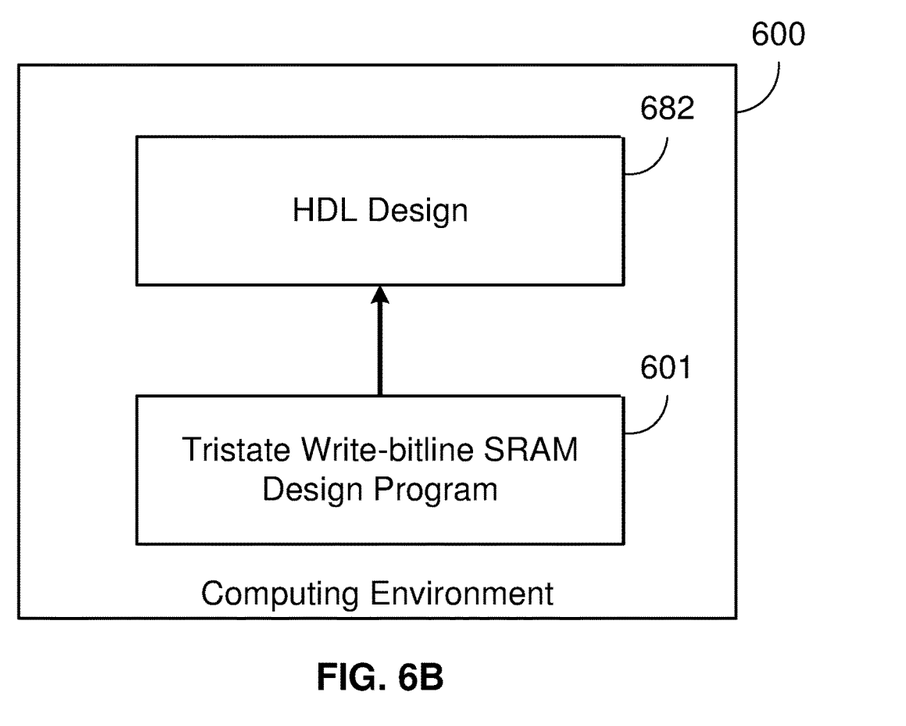
FIG. 6B is a block diagram depicting a computing environment for a tristate write-bitline SRAM design program, in accordance with at least one embodiment of the invention.
Figure 7:
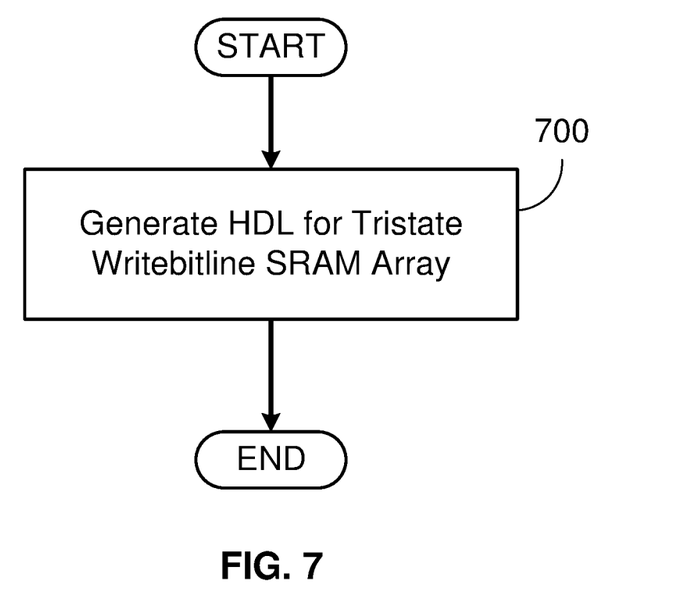
FIG. 7 is a flowchart diagram for a tristate write-bitline SRAM design program, in accordance with at least one embodiment of the invention.

FIG. 6B depicts a computing environment 600 (i.e., a desktop, workstation, laptop, virtual environment, etc.) wherein a tristate write-bitline SRAM design program 601 produces, as its output, an HDL 682 with properties along the lines of that of FIG. 6A. FIG. 7 provides a flowchart diagram for the tristate write-bitline SRAM design program 601. At step 700, the tristate write-bitline SRAM design program 601 generates an HDL representation of an integrated circuit, according to the foregoing description of such circuits and electronic representations of such circuits, according to the invention.

Figure 8:
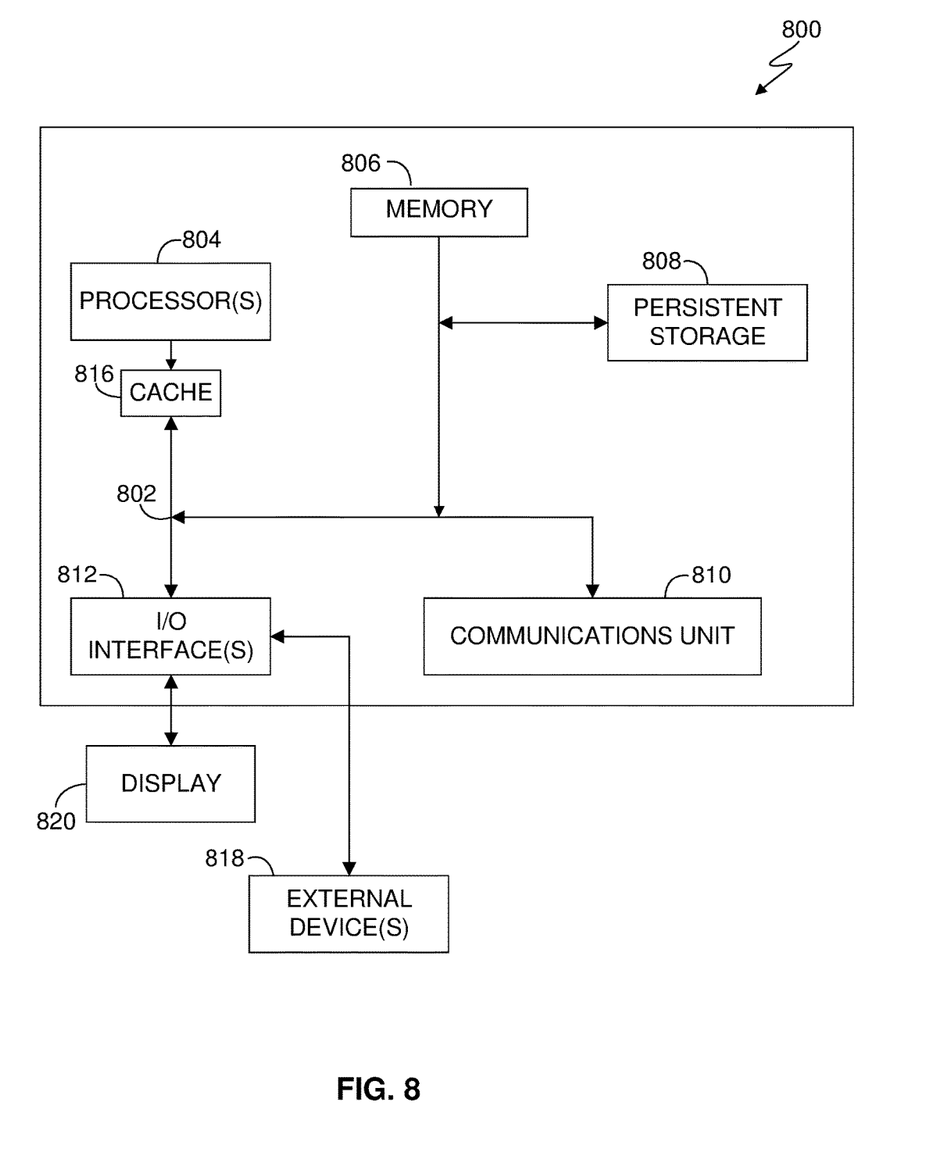
FIG. 8 is a block diagram depicting various logical elements for a computer system capable of executing program instructions, in accordance with at least one embodiment of the present invention.

FIG. 8 is a block diagram depicting components of a computer 800 suitable for executing the tristate write-bitline SRAM design program 601. FIG. 8 displays the computer 800, the one or more processor(s) 804 (including one or more computer processors), the communications fabric 802, the memory 806, the RAM, the cache 816, the persistent storage 808, the communications unit 810, the I/O interfaces 812, the display 820, and the external devices 818. It should be appreciated that FIG. 8 provides only an illustration of one embodiment and does not imply any limitations with regard to the environments in which different embodiments may be implemented. Many modifications to the depicted environment may be made.

As depicted, the computer 800 operates over a communications fabric 802, which provides communications between the cache 816, the computer processor(s) 804, the memory 806, the persistent storage 808, the communications unit 810, and the input/output (I/O) interface(s) 812. The communications fabric 802 may be implemented with any architecture suitable for passing data and/or control information between the processors 804 (e.g., microprocessors, communications processors, and network processors, etc.), the memory 806, the external devices 818, and any other hardware components within a system. For example, the communications fabric 802 may be implemented with one or more buses or a crossbar switch.

The memory 806 and persistent storage 808 are computer readable storage media. In the depicted embodiment, the memory 806 includes a random access memory (RAM). In general, the memory 806 may include any suitable volatile or non-volatile implementations of one or more computer readable storage media. The cache 816 is a fast memory that enhances the performance of computer processor(s) 804 by holding recently accessed data, and data near accessed data, from memory 806.

Program instructions for the tristate write-bitline SRAM design program 601 may be stored in the persistent storage 808 or in memory 806, or more generally, any computer readable storage media, for execution by one or more of the respective computer processors 804 via the cache 816. The persistent storage 808 may include a magnetic hard disk drive. Alternatively, or in addition to a magnetic hard disk drive, the persistent storage 808 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of the persistent storage 808.

The communications unit 810, in these examples, provides for communications with other data processing systems or devices. In these examples, the communications unit 810 may include one or more network interface cards. The communications unit 810 may provide communications through the use of either or both physical and wireless communications links. Tristate write-bitline SRAM design program 601 may be downloaded to the persistent storage 808 through the communications unit 810. In the context of some embodiments of the present invention, the source of the various input data may be physically remote to the computer 800 such that the input data may be received and the output similarly transmitted via the communications unit 810.

The I/O interface(s) 812 allows for input and output of data with other devices that may operate in conjunction with the computer 800. For example, the I/O interface 812 may provide a connection to the external devices 818, which may include a keyboard, keypad, a touch screen, and/or some other suitable input devices. External devices 818 may also include portable computer readable storage media, for example, thumb drives, portable optical or magnetic disks, and memory cards. Software and data used to practice embodiments of the present invention may be stored on such portable computer readable storage media and may be loaded onto the persistent storage 808 via the I/O interface (s) 812. The I/O interface(s) 812 may similarly connect to a display 820. The display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An integrated circuit, comprising:
   a static random access memory array;
   said static random access memory array comprising at least two cores, wherein only one of said at least two cores is written at a time;
   a tristate driver; and
   said tristate driver being configured to apply a high impedance state to one of said at least two cores that is not being written, in response to a signal from a logic NOR, wherein said logic NOR receives a first input signal from a write clock and a second input signal based on at least a portion of a write address, wherein said write address is directed to said static random access memory array.

2. The integrated circuit of claim 1, wherein said high impedance state is applied to a bitline driver of said one of said at least two cores that is not being written.

3. The integrated circuit of claim 1, wherein:
   said at least two cores comprise a first core and a second core;
   said first core is associated with a first state of a most significant bit of said write address;
   said second core is associated with a second state of said most significant bit of said write address; and
   said second input signal is driven by said most significant bit of said write address.

4. The integrated circuit of claim 1, wherein said logic NOR replaces an inline transistor from said tristate driver.

5. The integrated circuit of claim 1, further comprising a negative bitline write assist circuit configured for writing to said static random access memory array.

6. The integrated circuit of claim 1, wherein said high impedance state is applied to a write-bitline pair of inputs to each of those of said at least two cores that are not being written.

7. An electronic dataset product, comprising an electronically represented design for an integrated circuit stored on an electronic data storage medium and expressed in a hardware description language, said electronically represented design comprising designs for:
   a static random access memory array;

said static random access memory array comprising at least two cores, wherein only one of said at least two cores is written at a time;
a tristate driver; and
said tristate driver being configured to apply a high impedance state to one of said at least two cores that is not being written, in response to a signal from a logic NOR, wherein said logic NOR receives a first input signal from a write clock and a second input signal based on at least a portion of a write address, wherein said write address is directed to said static random access memory array.

8. The electronic dataset product of claim 7, wherein said high impedance state is applied to a bitline driver of said one of said at least two cores that is not being written.

9. The electronic dataset product of claim 7, wherein:
said at least two cores comprise a first core and a second core;
said first core is associated with a first state of a most significant bit of said write address;
said second core is associated with a second state of said most significant bit of said write address; and
said second input signal is driven by said most significant bit of said write address.

10. The electronic dataset product of claim 9, wherein said logic NOR replaces an inline transistor from said tristate driver.

11. The electronic dataset product of claim 9, said electronically represented design for an integrated circuit further comprising designs for a negative bitline write assist circuit configured for writing to said static random access memory array.

12. The electronic dataset product of claim 7, wherein said high impedance state is applied to a write-bitline pair of inputs to each of those of said at least two cores that are not being written.

13. A computer-implemented method, comprising generating, by one or more processors, a hardware description language representation of an integrated circuit, said integrated circuit comprising:
a static random access memory array;
said static random access memory array comprising at least two cores, wherein only one of said at least two cores is written at a time;
a tristate driver; and
said tristate driver being configured to apply a high impedance state to one of said at least two cores that is not being written, in response to a signal from a logic NOR, wherein said logic NOR receives a first input signal from a write clock and a second input signal based on at least a portion of a write address, wherein said write address is directed to said static random access memory array.

14. The computer-implemented method of claim 13, wherein said high impedance state is applied to a bitline driver of said one of said at least two cores that is not being written.

15. The computer-implemented method of claim 13, wherein:
said at least two cores comprise a first core and a second core;
said first core is associated with a first state of a most significant bit of said write address;
said second core is associated with a second state of said most significant bit of said write address; and
said second input signal is driven by said most significant bit of said write address.

16. The computer-implemented method of claim 13, wherein said logic NOR replaces an inline transistor from said tristate driver.

17. The computer-implemented method of claim 13, said integrated circuit further comprising designs for a negative bitline write assist circuit configured for writing to said static random access memory array.

* * * * *